US012711248B2

(12) United States Patent
Beekman et al.

(10) Patent No.: US 12,711,248 B2
(45) Date of Patent: Aug. 18, 2026

(54) DISTRIBUTED USER DATA MANAGEMENT SYSTEMS WITH LOCAL DATA STORAGE

(71) Applicant: Fortanix, Inc., Santa Clara, CA (US)

(72) Inventors: Jethro Gideon Beekman, Eindhoven (NL); Pieter Davy Johan Agten, Hechtel-Eksel (BE)

(73) Assignee: Fortanix, Inc., Santa Clara, CA (US)

( * ) Notice: Subject to any disclaimer, the term of this patent is extended or adjusted under 35 U.S.C. 154(b) by 134 days.

(21) Appl. No.: 18/665,043

(22) Filed: May 15, 2024

(65) Prior Publication Data

US 2025/0356029 A1 Nov. 20, 2025

(51) Int. Cl.
*G06F 21/60* (2013.01)

(52) U.S. Cl.
CPC .... *G06F 21/602* (2013.01); *G06F 2221/2111* (2013.01); *G06F 2221/2117* (2013.01)

(58) Field of Classification Search
CPC ........... G06F 21/602; G06F 2221/2111; G06F 2221/2117
See application file for complete search history.

(56) References Cited

U.S. PATENT DOCUMENTS

2018/0082082 A1* 3/2018 Lowenberg ........... G06F 21/602
2020/0336494 A1* 10/2020 Kitagata ............. H04L 63/0807
2022/0070000 A1* 3/2022 Gondza ................. H04L 63/123

* cited by examiner

*Primary Examiner* — Sangseok Park
(74) *Attorney, Agent, or Firm* — Lowenstein Sandler LLP

(57) ABSTRACT

A request to enroll a first user in a distributed user data management system is received by a processing device of a first user data management server. The request comprises an identifier of the first user. The first server is associated with a first region. An anonymous representation of the first user is determined based at least on the identifier and a one-way function. A mapping of the anonymous representation to the first region is stored in a first mapping store of the first server. An indication to synchronize the first mapping store with a second mapping store of a second user data management server is received from the second server. The indication comprises a mapping of an anonymous representation of the second user to a second region. The mapping of the anonymous representation to the second region is added to the first mapping store to synchronize the mapping stores.

20 Claims, 8 Drawing Sheets

DISTRIBUTED USER DATA MANAGEMENT SYSTEMS WITH LOCAL DATA STORAGE

TECHNICAL FIELD

Aspects and embodiments of the present embodiments relate to distributed systems, and in particular to distributed user data management systems with local data storage.

BACKGROUND

Data use policies dictate how user data may be collected, stored, processed, or distributed in various circumstances. Data use policies may be associated with different regions (e.g., geographical regions) and often provide different levels of privacy, protection, or regulation for user data. Examples of data use policies issued by government bodies include Europe's General Data Protection Regulation (GDPR), the California Consumer Privacy Act (CCPA), and the United States' Health Insurance Portability and Accountability Act (HIPAA). Other data use policies not issued by government bodies may similarly affect user data. For example, a company, university, or other organization may have internal data use policies.

BRIEF DESCRIPTION OF DRAWINGS

Various embodiments in accordance with the present disclosure will be described with reference to the drawings, in which.

DETAILED DESCRIPTION

Introduction

Figure 1A:
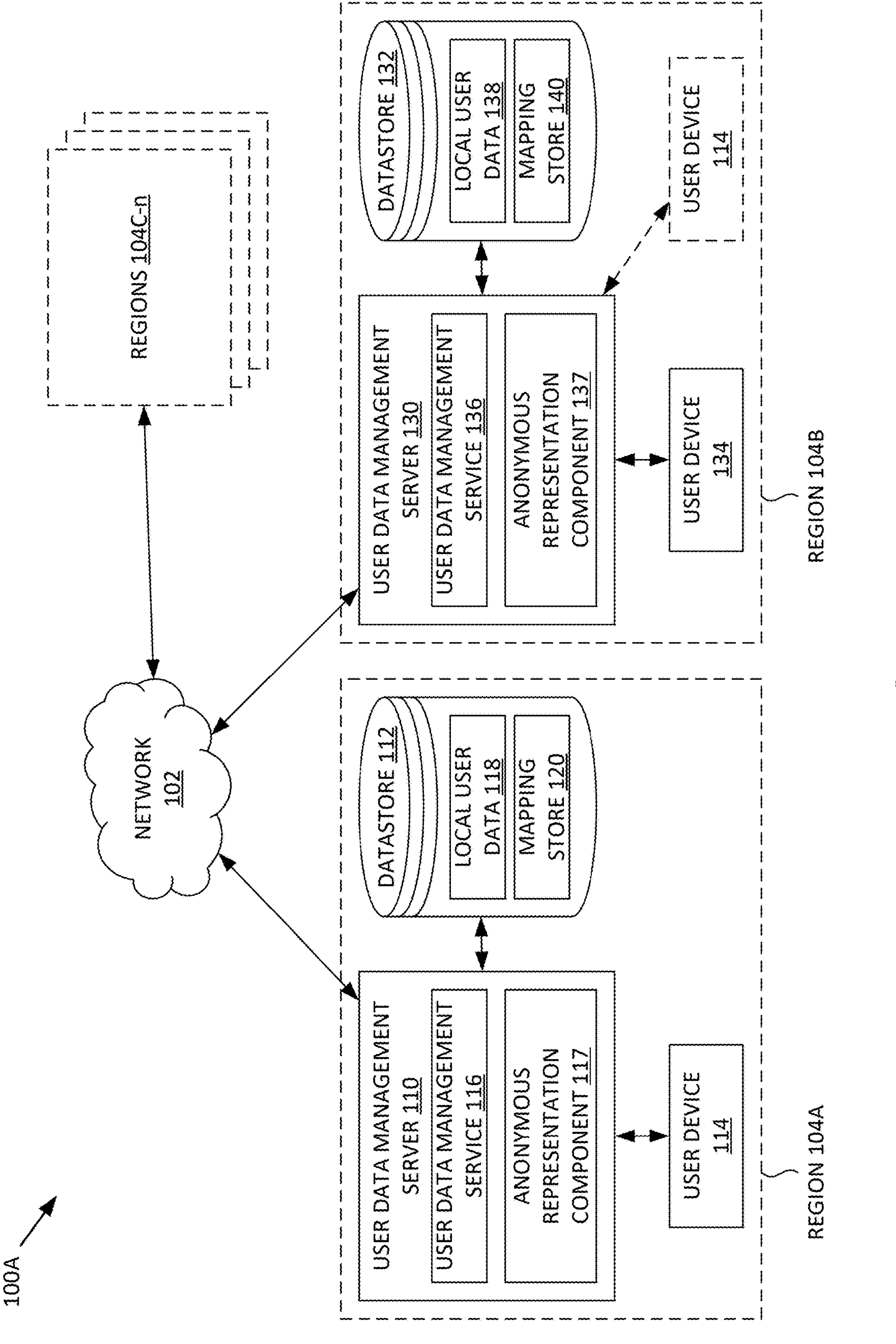
FIGS. 1A-B are block diagrams of example system architectures for distributed user data management systems with local data storage, in accordance with an embodiment.

Aspects and embodiments of the present disclosure relate to distributed user data management systems with local data storage. Distributed systems storing data in multiple regions (e.g., multiple geographic areas) may face challenges related to varying data use policies between regions. The present disclosure addresses these challenges with aspects for storing data locally within regions and retrieving data in accordance with regional data use policies. These challenges are outlined below, followed by an overview of the aspects responsive to these challenges and further details described with reference to the figures.

Cloud-based services often serve users in multiple regions such as continents, countries, cities, economic regions, service regions, or similar. Service architects often use distributed computer systems to host cloud-based services. A distributed computer system may include multiple servers distributed across multiple data centers in multiple regions. Similarly, a distributed computer system may include storage solutions (e.g., databases, file storage, archives, etc.) distributed across multiple data centers in multiple regions. A cloud-based service may store a user's data in a data center inside or outside of the user's home region. The cloud-based service may split or duplicate the user's data across multiple data centers as well. Service architects may choose a storage architecture based on various factors such as data redundancy, data availability, data transfer latency, data transfer bandwidth, or the like.

The above-described systems may face several challenges relating to data use policies that pertain to data of a cloud-based service's users. Among these challenges, without limitation, are: (i) complying with regional data use policies, (ii) identifying where user data is stored in compliant systems, and (iii) providing a consistent experience for users moving between regions. These example challenges are further described below.

First, the above-described systems may be challenged to comply with regional data use policies, such as data use policies issued by government bodies or other bodies. A data use policy of a region may dictate that some data is to be stored within the region, some data cannot be exported from the region, some data should be protected with specific security measures, or similar. The data affected by the data use policy may be data of a user living within the region, a user visiting the region, or a user otherwise associated with the region (e.g., an enrolled student at a university, a patient associated with a medical care provider). Data use policies may vary widely between regions. Adding additional complexity to the challenge, a user may be subject to multiple regions having different data use policies (e.g., a city region and a country region), and user data may be subject to multiple sensitivity levels under one or more data use policies (e.g., personally identifiable data may be treated differently than non-personally identifiable data).

Second, the above-described systems may be challenged to identify where user data is stored when in compliance with some data use policies. Some data use policies may restrict storage or export of personally identifiable information, such as a user's name, government-issued identifier, email address, etc. A system server in one region may thus be unable to identify that a user's data is stored in a second region because a system server in the second region may be unable to communicate any information about the user's identity to the system server in the first region.

Third, the above-described systems may be challenged to provide a consistent user experience for users moving between regions. Due to previously mentioned data export restrictions, a system server in a first region may be unable to obtain a visiting user's data from a system server in the user's home region, and thus may be unable to perform service-related operations on the user's data. Some features of the system may thus be non-functional or unavailable to the user when moving between different regions.

As a result of these and other challenges, system architects may experience increased costs and expenses related to achieving compliance within many regions having different data use policies and providing consistent user experiences between regions. Systems may experience increased liabilities and risks related to the complexities of achieving and maintaining compliance. Users may have poor experiences interacting with these systems as they move between regions, as some service features may be unavailable or non-functional due to differing data use policies between regions and the associated compliance challenges.

Aspects and embodiments of the present disclosure address the above and other challenges by providing distributed user data management with local data storage. An example distributed user data management system may include one or more of the following aspects: (i) multiple regional user data management servers/services, (ii) mapping stores that map users to respective regions where user data is stored, and (iii) privacy-preserving anonymous representations of users. These aspects are further described below.

In an embodiment, a distributed user data management system includes one or more user data management servers. Each user data management server may be associated with one or more regions, and a region may include one or more user data management servers. A user data management server of a region may store data of users living in the region or otherwise subject to one or more data use policies of the region. The user data management server may include the local region's data use policy(s) and may include configurations, rules, software components, etc. to provide compliance with the data use policy(s). The user data management server may make determinations about data storage, data export, and other data manipulations based on the policy(s). The user data management server may perform transactions with local users' data and export results (but not user data) to other regions if permitted by the data use policy(s).

In an embodiment, a user data management server includes a mapping store that includes one or more maps of users to regions and/or user data management servers where users' data are stored. A map may map a user to multiple regions and/or user data management servers. For example, a region may have multiple servers, a user may be associated with multiple regions (e.g., a city region and a country region), or a user's data may be divided among multiple regions/servers (e.g., based on data sensitivity). The user data management server may use the mapping store to determine where a user's data is stored and may communicate with a second user data management server storing the user's data to request the data or an operation to be performed on the data. The user data management server may further synchronize the mapping store with a mapping store of the second user data management server, enabling both servers to determine where a user's data is stored.

In an embodiment, a mapping store includes anonymous mappings of users to regions/servers that preserve privacy of user identifiers. A user data management server (or other component) may generate an anonymous representation of a user by providing a user identifier as input to a one-way function such as a hash function. The user identifier may be combined with a salt value, and the hash function may be repeatedly applied. Other anonymous representation generation techniques may be used. The anonymous representation may be mapped to a region/server in the mapping store. The user data management server may synchronize the anonymous representation with other user data management servers without exporting the user identifier from the region (which may not be permitted by a data use policy of the region).

Accordingly, cloud-based services and other systems using the techniques described herein can provide distributed user data management that is responsive to data use policies of different regions. As result, resources needed for achieving and maintaining compliance with data use policies are significantly reduced. Associated compliance risks and liabilities may also decrease. Furthermore, systems may be enabled to provide more consistent services and functionality across regions when permitted by data use policies, such as by processing data locally within a region rather than exporting data to another region. Thus, users may have improved experiences interacting with these systems as they move between regions.

System Architecture

FIG. 1A is a block diagram of an example system architecture 100A for a distributed user data management system with local data storage, in accordance with an embodiment. System architecture 100A (also referred to as "system" herein) includes network 102 and one or more regions 104A-n. In various embodiments, system 100A may include more or fewer components in different configurations than those depicted in FIG. 1A. For example, system 100A may include additional regions, user data management servers, user devices, etc.

Network 102 may include a public network (e.g., the Internet), a private network (e.g., a LAN, a WAN, a VPN, an enterprise network), a wired network (e.g., Ethernet), a wireless network (e.g., an 802.11 Wi-Fi network), a cellular network (e.g., a 5G network), routers, hubs, switches, server computers, or a combination thereof. For example, network 102 may include a plurality of the above types of networks connected together via a VPN, the Border Gateway Protocol (BGP), or other protocol. Network 102 or components thereof may be associated with different organizations in various embodiments. For example, components of network 102 may be associated with Internet Service Providers (ISPs), mobile or cellular carriers, cloud platform or software-as-a-service (SaaS) providers, private or public enterprises, private households or communities, etc. In an embodiment, network 102 (or a component thereof) may be a physical or virtual interconnect within a single device, such as a PCIe bus, a messaging system, a virtual bridge/switch, or an API.

In an embodiment, a region of regions 104A-n is a geographic or geopolitical region, such as a continent, country, state, province, county, city, economic region, treaty region, or similar. In an embodiment, a region of regions 104A-n is an organizational region, such as a university, government, non-profit, business, friend group, or similar. In an embodiment, a region of regions 104A-n is a virtual region, such as an Internet domain, a range of IP addresses, a cloud-based service, an association of Internet users (e.g., a friend group), or similar. In various embodiments, regions 104A-n may be the same type of region (e.g., of the various types of regions given above), or may be different types of regions (e.g., a mix of country, university, and domain regions).

A region of regions 104A-n may be associated with one or more data use policies. Data use policies may dictate how data may be collected, stored, processed, or distributed within or without a region. Data use policies may provide different levels of privacy, protection, or regulation for data. Data use policies may be imposed by an authority of the region, such as a regional government, board, etc. or may be adopted independently or voluntarily by entities within the region.

A region of regions 104A-n may be associated with one or more users. A user may be an individual, multiple individuals, an organization, or other entity(s). A region may be a home or primary region for the users of the region in some contexts. For example, the user may be domiciled in the region. A region may be an away or secondary region for the users of the region in some context. For example, the user may be temporarily visiting the region. A user or user device may have multiple home regions for different contexts. For example, region 104A may be a university region and may be a home region for school-related data, and region 104B may be an employer region and may be a home region for work-related data.

A user of a region may be associated with data (e.g., user data) that is within a scope of a data use policy of the region. For example, the data may be personally identifiable information, such as name, date of birth, social security number, address, email address, phone number, user ID, location data, etc. In another example, the data may be anonymized or aggregate data, such as survey results or demographics. Other examples of data include files, database entries, logs, multimedia, etc. Different types of data may have different sensitivity levels under a data use policy. For example, personally identifiable information may correspond to a higher sensitivity level (and therefore e.g., more security requirements under the data use policy) and aggregate data may correspond to a lower sensitivity level (e.g., fewer security requirements).

A region of regions 104A-n may include one or more user data management services/servers and associated storage, which together with other regions may form a distributed user data management system (e.g., system 100A). For example, region 104A includes user data management server 110 and datastore 112, and region 104B includes user data management server 130 and datastore 132. Other regions may have similar or different regional architectures, such as examples described with respect to FIG. 1B. Aspects described with reference to region 104A may be included in one or more of regions 104B-n.

User data management server 110 may be a personal computer (PC), a laptop computer, a notebook computer, a mobile phone, a smartphone, a tablet computer, a digital assistant, a rackmount server, a router computer, or similar computing device. An example computing device is further described with reference to FIG. 6. User data management server 110 may also be a virtualized resource such as a virtual machine (VM) or a containerized application. User data management server 110 may also correspond to a collection of physical or virtual computing resources, such as a datacenter or a collection of servers or VMs distributed across multiple data centers. For example, user data management server 110 may correspond to cloud computing resources provisioned from a cloud computing provider. User data management server 110 may run an operating system or one or more software applications, such as user data management service 116. In an embodiment, user data management server 110 includes anonymous representation component 167 for determining anonymous representations of users, as described with reference to FIG. 3.

Figure 5:
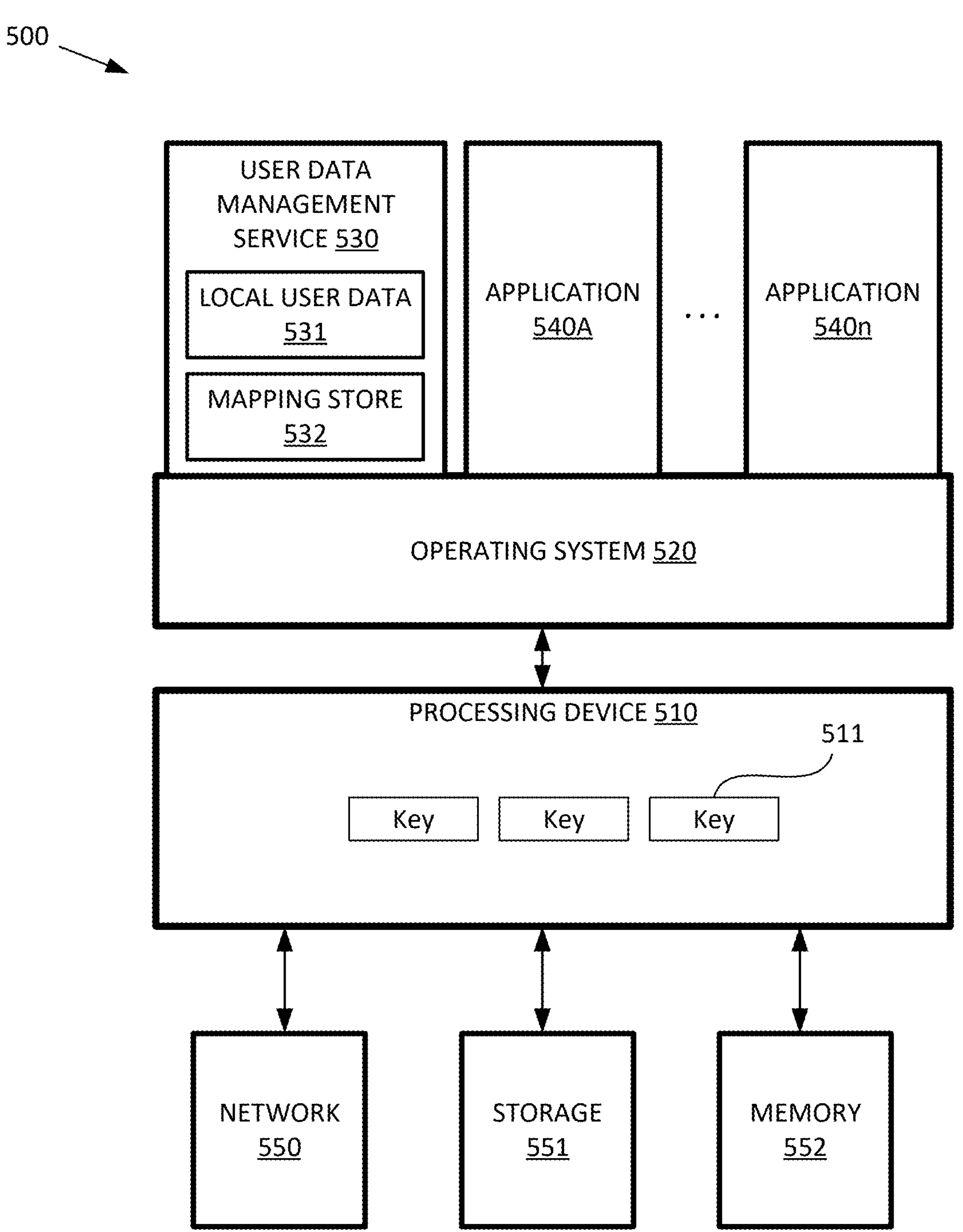
FIG. 5 illustrates an example network server having a secure environment for providing distributed user data management with local data storage, in accordance with an embodiment.
Figure 6:
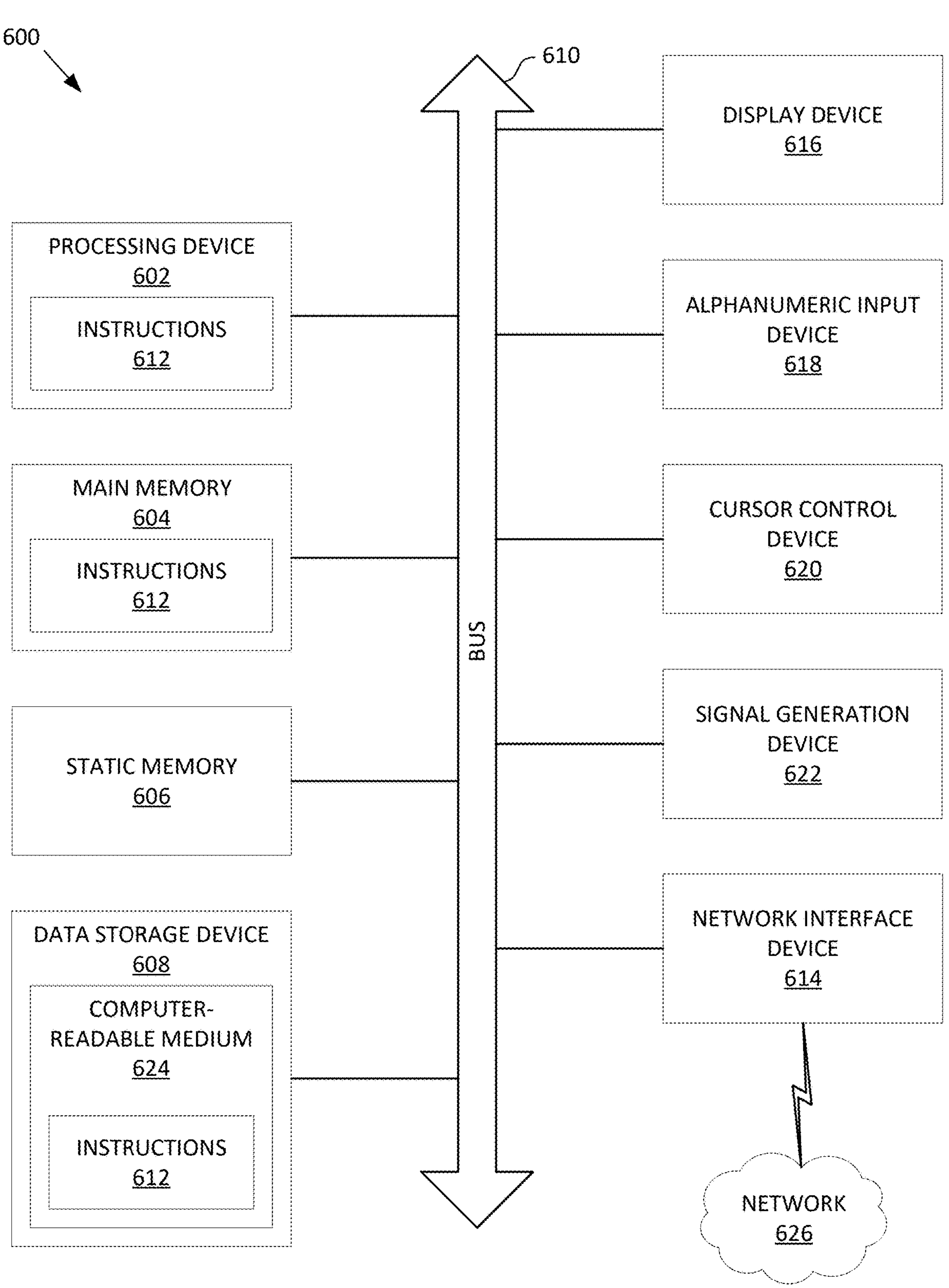
FIG. 6 illustrates an example computer system, in accordance with an embodiment.

Datastore 112 may include one or more persistent storage devices such as magnetic tapes or drives, solid-state drives, optical drives or similar (e.g., other storage technologies discussed with respect to FIG. 6). Datastore 112 may also include storage devices in a networked topology, such as a Storage Area Network (SAN), Network-Attached Storage (NAS), cloud-provisioned storage, or similar. Datastore 112 may be shared by other components (e.g., additional user data management servers 110), or region 104A may include multiple datastores 112 each associated with one or more components. In an embodiment, datastore 112 may be some other type of persistent storage such as an object-oriented database, a relational database, and so forth, that may be hosted by user data management server 110 or one or more different machines of region 104A. Datastore 112 includes local user data 118 and mapping store 120. In an embodiment, local user data 118 and/or mapping store 120 may be stored in a secure environment as described with reference to FIG. 5.

In an embodiment, user data management server 110, via user data management service 116, manages data of users of region 104A in accordance with data use policies of region 104A. User data management server 110 may facilitate enrollment of local users in a distributed user data management system, e.g., via an API, an enrollment webpage, or similar. User data management server 110 may store user data at local user data 118 of datastore 112 and may service requests to provide the user data to other entities in accordance with the data use policies. User data management server 110 may also perform transactions with user data without exporting the user data if such transactions are permitted by the data use policies. For example, user data management server 110 may validate user login requests, generate cryptographic data objects in association with user data (e.g., certificates, keys, passwords), or similar.

In an embodiment, user data management server 110 communicates with user data management servers in the same or other regions to facilitate interactions with user data stored in the same or other regions. For example, user data management server 110 may communicate with user data management server 130 to facilitate access to user data of local user data 138 from region 104A, if permitted by respective data use policies of regions 104A-B. User data management server 110 may similarly receive communications from user data management server 130 related to transactions with user data of local user data 118. In an embodiment, user data management servers 110 and 130 may use encrypted communication protocols or other protocols to communicate user data between regions in a secure manner if permitted or required by respective data use policies of the regions. In an embodiment, user data management servers 110 and 130 may use secure environments for storing, transacting with, or communicating user data. Secure environments are further described with reference to FIG. 5.

In an embodiment, user data management servers 110 and 130 include respective mapping stores 120 and 140 for storing mappings of users to regions and/or user data management servers. A mapping may associate a user with a location where the user's data is stored. Example mappings are further described with reference to FIGS. 2A-B. User data management servers of system 100A may synchronize mapping stores between each other such that each user data management server may include a complete mapping of each user of system 100A to a respective region. Synchronization may involve, for example, a user data management server sending a new mapping to other user data management servers (e.g., upon enrollment of a new user), and the other user data management servers adding the mappings to their respective mapping stores. User data management servers may perform additional communications and operations to ensure synchronization. For example, user data management servers may exchange hashes of individual mappings or entire mapping stores to ensure synchronization between mapping stores. In an embodiment, user data management servers may use secure environments and cryptographic protocols to store and synchronize mapping stores.

A region of regions 104A-n may include one or more user devices associated with users of the region. For example, region 104A includes user device 114 and region 104B includes user device 134. Aspects described with reference to user device 114 may apply to user device 134 or other user devices. User device 114 may be a personal computer (PC), a laptop computer, a notebook computer, a mobile phone, a smartphone, a tablet computer, a digital assistant, a rack-mount server, a router computer, or similar computing device. An example computing device is further described with reference to FIG. 6. User device 114 may also be a virtualized resource such as a virtual machine (VM) or a containerized application. User device 114 may also correspond to a collection of physical or virtual computing resources, such as a datacenter or a collection of servers or VMs distributed across multiple data centers. For example, user device 114 may correspond to cloud computing resources provisioned from a cloud computing provider. User device 114 may run an operating system or one or more software applications, such as a client application for a cloud-based service that stores user data. In an embodiment, user device 114 may have no corresponding user (e.g., it may be an IoT device or other automated device). Aspects described herein with reference to user devices having corresponding users may apply to user devices having no corresponding users.

In an embodiment, user device 114 (e.g., on behalf of its respective user) may enroll in a distributed user data management system through a local user data management server (e.g., of the home region), and the user's data may be stored in the region in accordance with the regional data use policy(s). For example, user device 114 (e.g., under control of a respective user) may enroll in system 100A via user data management server 110, and user data associated with user device 114 may be stored in datastore 112 as local user data 118 in accordance with a data use policy of region 104A. User device 114 may provide or request user data of local user data 118, may request transactions to be performed using user data of local user data 118 (e.g., requesting validation of a login with specified user credentials), or similar.

In an embodiment, a user and/or user device may be exposed to regions other than the home region. For example, user device 114 may move from region 104A to region 104B (e.g., as depicted by the dashed outline of user device 114 in region 104B) when the user is traveling, moving, transitioning between life domains (e.g., work and school), or similar. In another example, user device 114 may access a cloud-based service hosted in region 104B from region 104A (e.g., via network 102). The user, user device, or cloud-based service may provide, request, transact, etc. with the user data stored in the home region via user data management servers in the home and away regions, if permitted by data use policies of the respective regions. For example, user device 114 or a cloud-based service of region 104B may interact with user data of local user data 118 via user data management servers 110 and 130 and network 102. Data use policies may further require user data to be stored in the away region when the user is visiting, and thus the above aspects may similarly apply when the user returns to the home region. For example, user device 114 may access user data of local user data 138 after returning to region 104A via user data management servers 110 and 130 and network 102.

Figure 1B:
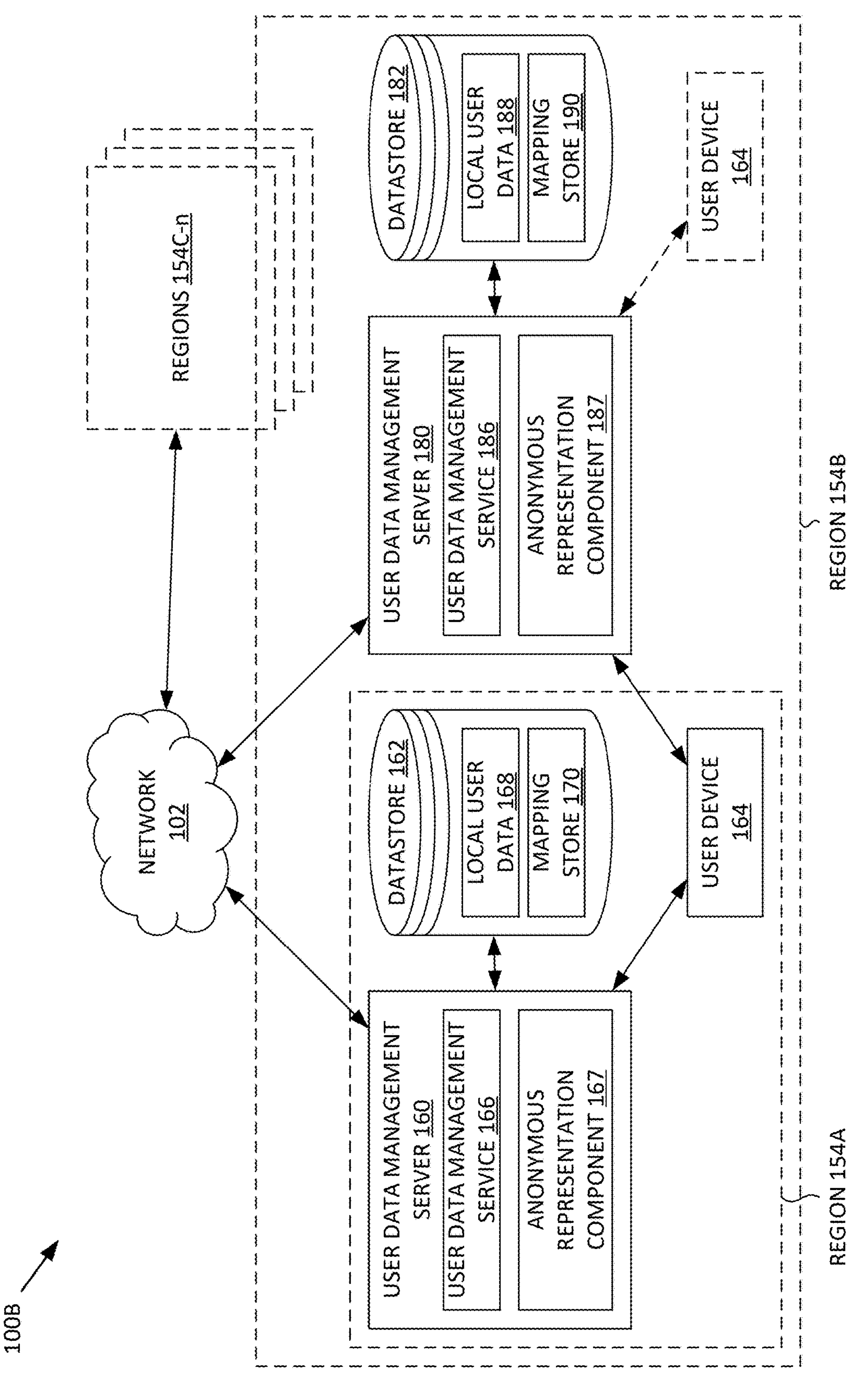

FIG. 1B is a block diagram of an example system architecture 100B for a distributed user data management system with local data storage, in accordance with an embodiment. System architecture 100B (also referred to as "system" herein) includes network 102 and one or more regions 154A-n. Aspects described with reference to FIG. 1A may similarly apply to FIG. 1B and vice versa. For example, regions 104A-n of FIG. 1A may correspond to regions 154A-n of FIG. 1B, user data management servers 110 and 130 may correspond to user data management servers 160 and 180, datastores 112 and 132 may correspond to datastores 162 and 182, and user device 114 and correspond to user device 164. In an embodiment, aspects of systems 100A-B are combined. In various embodiments, system 100B may include more or fewer components in different configurations than those depicted in FIG. 1B. For example, system 100B may include additional regions, user data management servers, user devices, etc.

A region of regions 154A-n may wholly or partially overlap with another region or may include another region. For example, region 154B includes region 154A and partially overlaps with regions 154C-n. In a geopolitical example, region 154B may correspond to a country and region 154A may correspond to a state or province. In an organizational example, region 154B may correspond to a university, region 154A may correspond to a school within the university and regions 154C-n may correspond to partner institutions at other universities. In a data sensitivity example, region 154B may correspond to a broader set of user data with a default low sensitivity level (e.g., publicly available profile data on a social media site) and region 154A may correspond to a subset of the broader set with a high sensitivity level (e.g., private profile settings or contact info), or vice versa.

In an embodiment, a user may be associated with multiple regions. For example, user device 164 and its associated user may be domiciled in region 154A (e.g., a state) as well as region 154B (e.g., a country). User data may be stored at the user data management server of one or both regions. For example, as indicated with the solid outline and solid arrows, user device 164 may communicate with user data management servers 160 and 180 to store or interact with user data of local user data 168 and 188 while user device 164 is in both regions. As indicated with the dashed outline and dashed arrow, user device 164 may move outside of region 154A while still within region 154B. In this example, user device 164 may interact with user data of local user data 188 directly through user data management server 180 and may interact with user data of local user data 168 via user data management servers 160 and 180 if permitted by a data use policy of region 154A.

In an embodiment, a user data management server may serve multiple regions. For example, user data management server 160 may serve users in regions 154A-B. User data management server 160 may include multiple user data management services 166 and/or separate local user data 168 for the multiple regions, e.g., if required by respective data use policies. In an embodiment, a region may have multiple user data management servers. For example, user data management servers 160 and 180 may each serve region 154B. In another example, any of the various user data management servers or services depicted in FIGS. 1A-B may be duplicated within a region to provide sufficient service capacity to serve the number of users in a respective region. In these various embodiments and examples, mapping stores of respective user data management servers may include mappings of users to one or more regions and/or one or more user data management servers a region as appropriate.

Figure 2A:
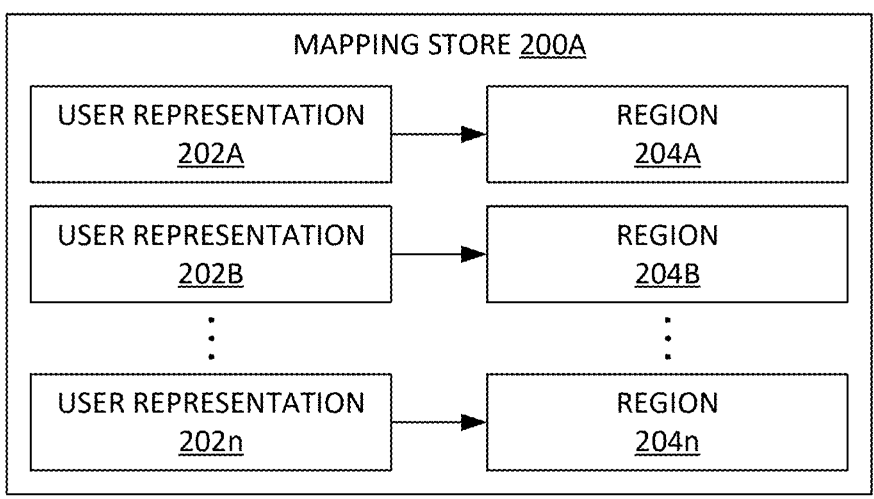
FIGS. 2A-B are block diagrams of example mapping stores for providing mappings of users to regions, in accordance with an embodiment.
Figure 2B:
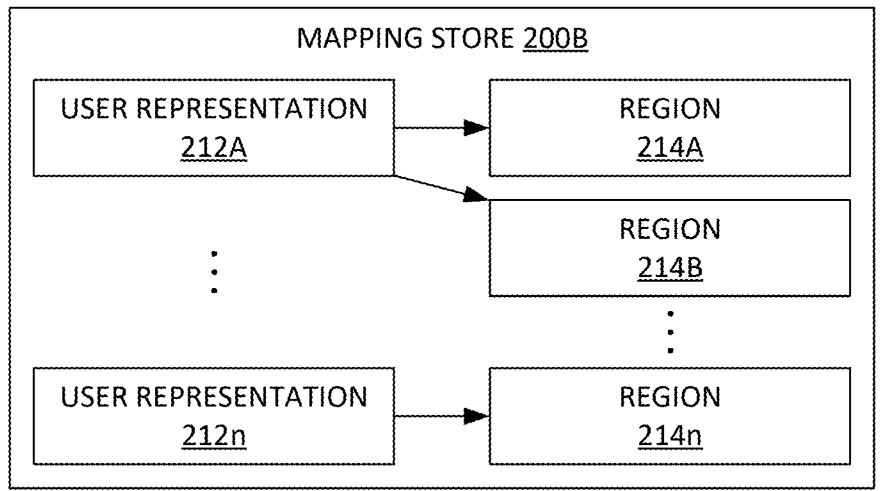

FIGS. 2A-B are block diagrams of example mapping stores 200A-B for providing mappings of users to regions, in accordance with an embodiment. Mapping stores 200A-B may correspond to mapping stores 120, 140, 170, and/or 190 of FIGS. 1A-B. Mapping store 200A includes one or more one-to-one mappings of user representations 202A-n to respective regions 204A-n. Mapping store 200B includes one or more one-to-many mappings of user representations 212A-n to respective regions 214A-n. The mappings may be generated by an associated user data management server or may be provided by other user data management servers in a synchronization operation. Regions 204A-n and 214A-n may correspond to regions 104A-n and/or 154A-n of FIGS. 1A-B. In an embodiment, regions 204A-n and 214A-n may correspond to user data management servers of regions.

User representations 202A-n and 212A-n include identifying information or other data that is associated with a user. For example, user representations 202A-n and 212A-n may be associated with users of user devices 114, 134, and/or 164. A user representation may be unique or non-unique. Examples of user representations include user IDs, names, email addresses, phone numbers, social security numbers, etc. As described with reference to FIG. 3, a user representation may be an anonymous representation, which may provide protection and anonymity (e.g., as required by a data use policy) for personally identifiable user representations that may be transferred between user data management servers during a synchronization operation.

Mappings of users to regions may be one-to-one (e.g., mapping store 200A) or one-to-many (e.g., mapping store 200B) in various embodiments. A one-to-one mapping may correspond to a user data management system where each user is associated with a single home region. For example, a user of user device 114 of FIG. 1A may be associated with a single home region 104A. A one-to-many mapping may correspond to a user data management system where each user may be associated with one or more home regions. For example, a user of user device 164 of FIG. 1B may be associated with home regions 154A (e.g., a state) and 154B (e.g., a country). In an embodiment, mappings of users to regions may be many-to-one or many-to-many (not depicted). For example, a user data management server may perform a reverse-lookup to determine which users are associated with one or more identified regions or user data management servers.

In an embodiment, mappings to regions may be based on other factors in addition to user representations. For example, user data may be associated with data sensitivity levels or may be associated with multiple data use policies having different scopes (e.g., one policy may affect all of a user's data, while another policy may affect a subset of the user's data). In this example, mappings to regions may be based on user representations and a sensitivity, scope, or other characteristic of user data.

In an embodiment, mappings of mapping stores 200A-B may include additional information in user representations 202A-n/212A-n, regions 204A-n/214A-n, or other fields. For example, mapping stores 200A-B may indicate a date and time when a user was enrolled in a distributed user data management system. In another example, mapping stores 200A-B may indicate a user history such as previous home regions where data might still be stored (e.g., a user may move to a new country or transfer to a new university). In another example, mapping stores 200A-B may indicate an occupation or other characteristic of a user that may have some bearing on data sensitivity or storage location (e.g., a security clearance level). Other types of information may be included in various embodiments.

Figure 3:
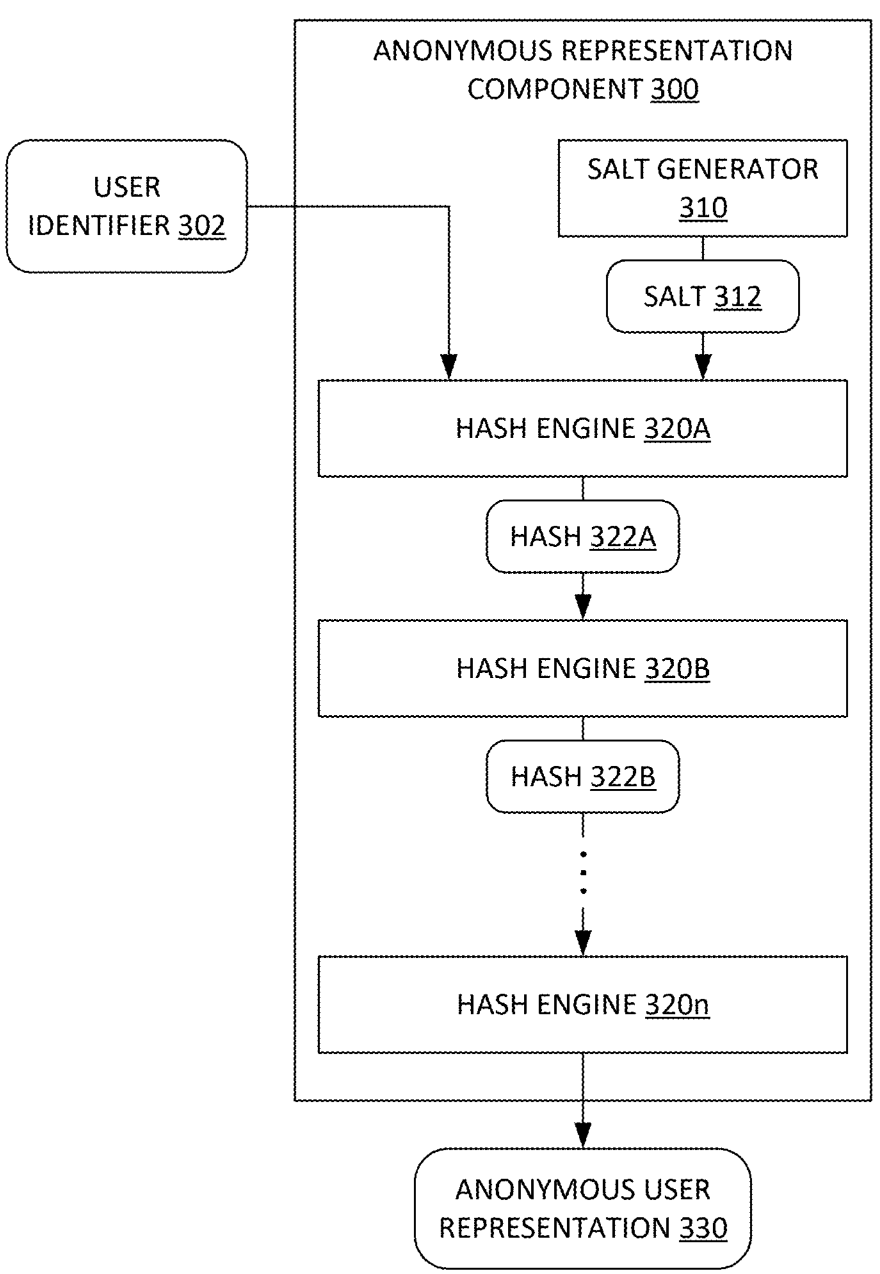
FIG. 3 is a block diagram of an example anonymous representation component for generating anonymous user representations for mapping stores, in accordance with an embodiment.

FIG. 3 is a block diagram of an example anonymous representation component 300 for generating anonymous user representations for mapping stores, in accordance with an embodiment. Anonymous representation component 300 may correspond to anonymous representation components 117, 137, 167, and/or 187 of respective user data management servers of FIGS. 1A-B. Anonymous representation component 300 includes salt generator 310 and one or more hash engines 320A-n. In various embodiments, anonymous representation component 300 may include more or fewer components in different configurations than those depicted in FIG. 3. For example, more inputs may be used, fewer rounds (e.g., a single round) of hashing may be used, or salt generator 310 and salt 312 may be absent.

Anonymous representation component receives user identifier 302 as an input. User identifier 302 may correspond to an anonymous or non-anonymous user representation, such as one or user representations 202A-n or 212A-n of FIGS. 2A-B. Anonymous representation component 300 may receive user identifier 302 from user data management service 116 (or equivalent), user data management server 110 (or equivalent), or other component of systems 100A-B.

Salt generator 310 generates salt 312. Salt generator 310 may be a random number generator or other cryptographic component for generating sequences suitable for salts. Salt 312 may thus be a random or non-random sequence. User identifier 302 and salt 312 may be combined to form an input to hash engine 322A. For example, salt 312 may be appended to, prepended to, or otherwise merged with user identifier 302.

Hash engine 320A calculates a one-way function such as a hash function (e.g., MD5, SHA-256, etc.), an encryption function, a function based on factoring large numbers, or similar. Hash engine 320A may receive the combined input of user identifier 302 and salt 312 to generate hash 322A. Hash engines 320B-n may be the same hash engine as hash engine 320A or may be different hash engines (e.g., calculating different one-way functions). Hash engine 320B may receive hash 322A as input and generate hash 322B. The process may continue until hash engine 320*n* generates anonymous user representation 330. Anonymous user representation 330 may be associated with a respective region in a mapping and may be added to a mapping store (e.g., one of mapping stores 200A-B). In an embodiment, a single round of hashing may be used (e.g., hash engine 320A generates anonymous user representation 330).

Distributed User Data Management with Local Storage

Figure 4A:
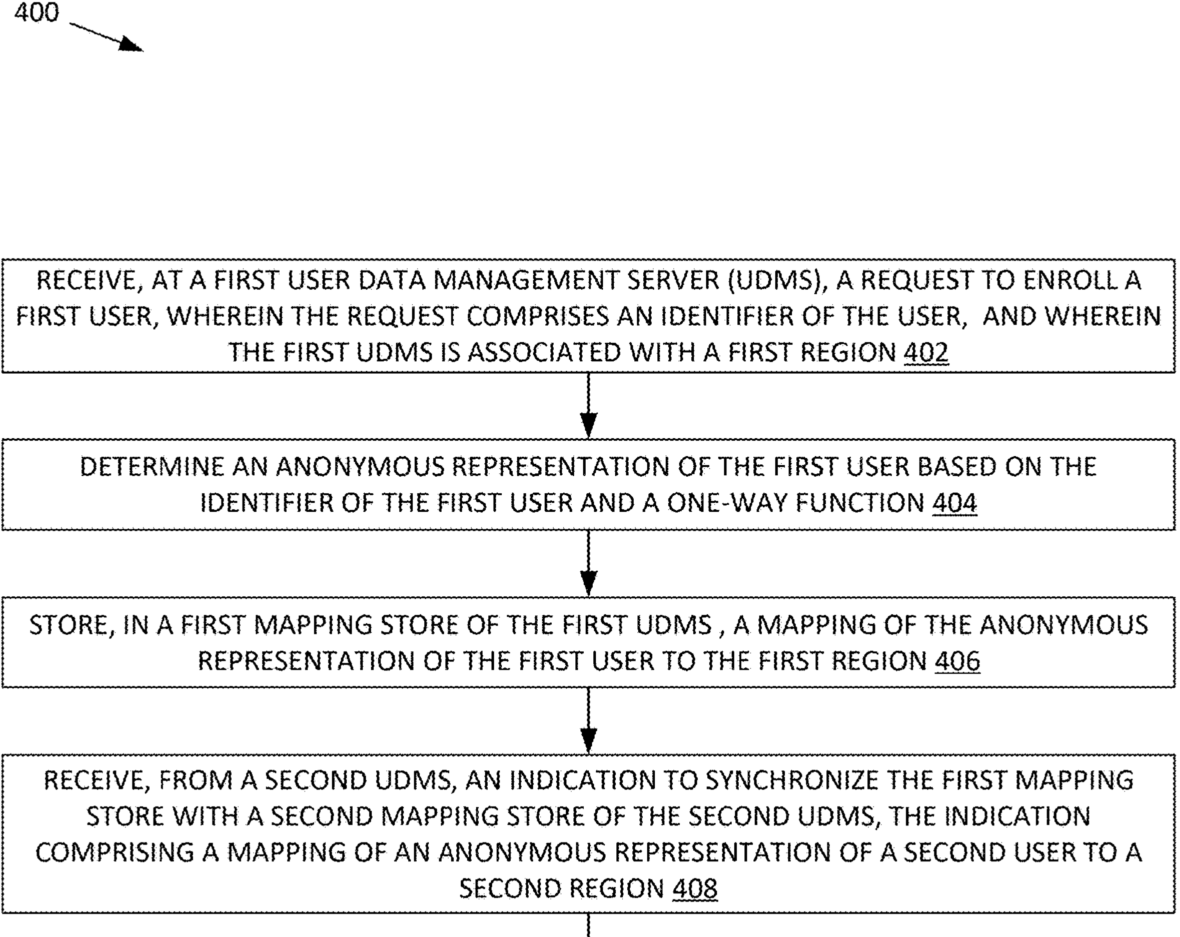
FIGS. 4A-B are a flow diagram of an example method for providing distributed user data management with local data storage, in accordance with an embodiment.

FIG. 4 is a flow diagram of an example method 400 for providing distributed user data management with local data storage, in accordance with an embodiment. Method 400 may be performed by processing logic that may include hardware (e.g., circuitry, dedicated logic, etc.), computer-readable instructions such as software or firmware (e.g., run on a general-purpose computing system or a dedicated machine), or a combination thereof. For instance, an example system may include a memory and a processing device coupled to the memory device to perform operations comprising the blocks of method 400. Method 400 may also be associated with a set of instructions stored on a non-transitory computer-readable medium (e.g., magnetic or optical disk, etc.). The instructions, when executed by a processing device, may cause the processing device to perform operations comprising the blocks of method 400. In an embodiment, method 400 is performed by the systems of FIGS. 1A-B or components thereof (e.g., user data management servers 110, 130, 160, 180, respective user data management services, user devices 114, 134, 164, etc.). In an embodiment, method 400 is performed by computing system 600 of FIG. 6. In some embodiments, blocks depicted in FIG. 4 could be performed simultaneously or in a different order than depicted. Various embodiments may include additional blocks not depicted in FIG. 4 or a subset of blocks depicted in FIG. 4. For example, blocks depicted with a dashed outline (e.g., blocks 412-424) may be absent in an embodiment.

At block 402, processing logic associated with a first user data management server of a distributed user data management system receives a request to enroll a first user in the distributed user data management system, wherein the request includes an identifier of the first user, and wherein the first user data management server is associated with a first region of the distributed user data management system. The distributed user data management system may be systems 100A and/or 100B of FIGS. 1A-B. The first region may be one of regions 104A-n or 154A-n. The first user data management server may be one of user data management servers 110, 130, 160, 180, or other user data management servers not depicted. The first user may be associated with one of user devices 114, 134, 164, or other user devices not depicted. The identifier of the first user may be one of user representations 202A-n/212A-n of FIG. 2 or user identifier 302 of FIG. 3. In an embodiment, request to enroll the first user further includes an indication that the first user is associated with the first region. For example, the request may indicate that the first region is the first user's home region, that the first user is a student or employee of an entity corresponding to the first region, or similar. The request or the identifier may include other types of data that may identify the first user or provide other useful information about the first user, such as an email address, phone number, etc. In an embodiment, the first user data management server includes a secure environment for storing mappings of users to regions, storing user data, performing transactions with user data, and/or performing other actions relevant to the distributed user data management system.

At block 404, the processing logic determines an anonymous representation of the first user based at least on the identifier of the first user and a one-way function. The anonymous representation of the first user may be one of user representations 202A-n/212A-n or anonymous user representation 330. The one-way function may be a hash function or other type of one-way function such as those described with reference to FIG. 3.

In an embodiment, determining the anonymous representation of the first user includes combining the identifier of the first user with a salt value, generating a first hash output of a cryptographic hash function using the combined identifier of the first user and salt value as input to the cryptographic hash function, and generating a second hash output of the cryptographic hash function using he first hash output as input to the cryptographic hash function. The salt value may be salt 312, the first hash output may be hash 322A, and the second hash output may be hash 322B or anonymous user representation 330. The first and second hash outputs may be generated by hash engines 320A-B, respectively. The one-way function may be associated with one or both of hash engines 320A-B (e.g., they may provide the same or different one-way functions). In various embodiments, salt 312 may or may not be used and there may be more or fewer rounds of hashing as described with reference to FIG. 3.

At block 406, the processing logic stores, in a first mapping store of the first user data management server, a mapping of the anonymous representation of the first user to the first region. The first mapping store may be one of mapping stores 120, 140, 170, 170, or 200A-B. The mapping of the anonymous representation of the first user to the first region may correspond to the mapping of user representation 202A to region 204A or other mappings of FIGS. 2A-B. The mapping may be a one-to-one, one-to-many, many-to-one, or many-to-many mapping as described with reference to FIG. 2. In an embodiment, storing the mapping of the first user to the first region may include inserting the mapping among one or more existing mappings of the store. For example, the mapping may be appended to a list, inserted in a binary tree, or similar. In an embodiment, storing the mapping of the first user to the first region may include modifying an existing mapping of the first mapping store. For example, an existing one-to-many mapping of the first user to other regions may be modified to additionally include the first region. In an embodiment, the representation of the first user may be non-anonymous. For example, the processing logic may store a mapping of the first user's name, email address, etc. to the first region without any anonymizing operations of block 404.

At block 408, the processing logic receives, from a second user data management server of the distributed user data management system, an indication to synchronize the first mapping store with a second mapping store of the second user data management server, the indication comprising a mapping of an anonymous representation of a second user to a second region of the distributed user data management system. The second region may be one of regions 104A-n or 154A-n. The second user data management server may be one of user data management servers 110, 130, 160, 180, or other user data management servers not depicted. The second user may be associated with one of user devices 114, 134, 164, or other user devices not depicted. The anonymous representation of the second user may be one of user representations 202A-n/212A-n or anonymous user representation 330. The second mapping store may be one of mapping stores 120, 140, 170, 170, or 200A-B. In an embodiment, the representation of the second user may be non-anonymous as described with reference to block 406.

At block 410, the processing logic synchronizes the first mapping store with the second mapping store by adding, to the first mapping store, the mapping of the anonymous representation of the second user to the second region of the distributed user data management system. As described with reference to block 406, adding the mapping of the second user to the second region may include inserting the mapping among existing mappings or modifying an existing mapping. In an embodiment, synchronizing the first and second mapping stores may include performing additional synchronization communications and protocols between the first and second user data management server. For example, the servers may calculate hashes of one or more mappings or the entire first and second mapping stores and exchange hashes to ensure consistency.

At block 412, the processing logic receives, at the first user data management server, a second request directed to data of the second user, wherein the second request comprises an identifier of the second user. The data of the second user may be data of local user data 118, 138, 168, 188, or other local user data not depicted. The identifier of the second user may be one of user representations 202A-n/212A-n or user identifier 302. The request may be a request to retrieve the data, store the data, perform a transaction with the data (e.g., an authentication transaction or other types of transactions previously described), or similar. The request may be a request to provide a data use policy or other decision metric relevant to the second user data (e.g., provide data use policies affecting personally identifiable user data).

In an embodiment, the second request is received from a cloud-based service or other service. The service may be a service of the first region and may be contacting the local user data management server—the first user data management server—to obtain the data of the second user. In an embodiment, the second request is received from the first user data management server. For example, the second request may be a self-request of the first user data management server or a user data management service thereof, or the second request may be a request of a cloud-based service running on the first user data management server to a user data management service running on the first user data management server.

At block 414, the processing logic identifies the second user data management server based at least on the identifier of the second user, the one-way function, and the first mapping store, wherein the second user data management server is associated with the second region, and wherein the data of the second user is stored at the second user data management server.

In an embodiment, identifying the second user data management server comprises determining the anonymous representation of the second user based on the identifier of the second user (e.g., from block 408) and the one-way function, and identifying the second region based on the anonymous representation of the second user and the mapping of the anonymous representation of the second user to the second region added to the first mapping store (e.g., added in block 410). For example, the processing logic may determine the anonymous representation by providing the identifier of the second user as input to anonymous representation component 300 and perform a similar procedure to that described with reference to block 404 (e.g., including salt values and hash engines as appropriate).

In an embodiment, the processing logic identifies the second user data management server with a non-anonymous representation of the second user. For example, the processing logic may identify region 204A based on the mapping of user representation 202A to region 204A of mapping store 200A.

At block 416, the processing logic provides, to the second user data management server, a third request directed to the data of the second user, wherein the third request comprises an identifier associated with the first region. For example, the processing logic may forward the second request of block 412 to the second user data management server and provide the identifier associated with the first region as an addendum to the second request or as a separate communication. In another example, the processing logic may generate a new request, which may obscure or not include an identifier of a provider of the second request (e.g., it may appear that the first user data management server is the requestor). The identifier associated with the region may be an internal identifier associated with the distributed user data management system (e.g., a unique identifier assigned to the region by the system), an external identifier (e.g., a country/state/city name), or other type of identifier.

In an embodiment, the processing logic alternatively provides an identifier of the second user data management server to the provider of the second request. of block 412. The provider of the second request may then perform block 416 and subsequent blocks by contacting the second user data management server directly.

At block 418, the processing logic receives a determination of the second user data management server indicating that the third request is to be fulfilled based at least on a data use policy associated with the second region and the identifier associated with the first region. The data use policy may be one of the types or examples of data use policies previously described (e.g., GDPR, institutional policy, etc.). The determination may be based on multiple policies. In an embodiment, the determination may indicate that the third request is not to be fulfilled based at least on the data use policy associated with the second region and the identifier associated with the first region.

In an embodiment, the determination of the second user data management server comprises at least one of: the data of the second user, a transaction completion message indicating that a transaction with the data of the second user was completed in the region, or the data use policy associated with the second region (and/or the second user data management server). A determination comprising the data of the second user may correspond to a second/third request for retrieving the data. A transaction completion message may correspond to a second/third request for a data transaction to be performed at the second user data management server (e.g., an authentication transaction or similar transactions previously described). A determination comprising the data use policy(s) may correspond to the above types of second/third requests or a request to provide data use policies or other decision metrics of the second user data management server and/or the second region.

In an embodiment, the second request is received from the second user, wherein the second user is located in the first region, wherein the third request further comprises an indication that the second request is received from the second user, and wherein the determination of the second user data management server is further based on the second request being received from the second user. For example, the second region may be the second user's home region, and the second user may be visiting the first region. The second request may be received directly from the second user (e.g., via an associated user device), may be received from a cloud-based service on the second user's behalf (e.g., the second user is interacting with a service in the first region), or may be received in some other manner. The determination may be based on a user data policy that does not permit export of user data from the second region to the first region unless the owner of the user data is the requestor, and thus the second request being received from the second user may be a deciding factor in the determination of the second user data management server.

Referring to blocks 420-424, in an embodiment, the data of the second user is associated with a first data sensitivity level, wherein the second request is further directed to second data of the second user associated with a second data sensitivity level. For example, the first data sensitivity level may correspond to personally identifiable information and the second data sensitivity level may correspond to aggregate data, or vice versa. The first and second data sensitivity levels may correspond to the same or different data use policies. For example, one data use policy may define data sensitivity levels for personally identifiable information and aggregate data. In another example, two data use policies may have overlapping scope, and thus the first data sensitivity level may correspond to data within the scope of both policies and the second data sensitivity level may correspond to data within the scope of one policy, or vice versa. The two data policies may correspond to overlapping regions, such as a state within a country or similar.

At block 420, the processing logic identifies a third user data management server based at least on the identifier of the second user and the second data sensitivity level, wherein the third user data management server is associated with the second region and a third region, and wherein the second data of the second user is stored at the third user data management server. The third region may be one of regions 104A-n or 154A-n. The third user data management server may be one of user data management servers 110, 130, 160, 180, or other user data management servers not depicted. The processing logic may identify the third user data management server by generating an anonymous representation of the second user described with reference to blocks 404 and 414. The processing logic may use a mapping of user representations and data sensitivity levels to regions to identify the third user data management server. The mapping may further or alternatively use other data characteristics as described with reference to FIG. 2 to map users and data to regions.

In an embodiment, the second and third regions are the same region, and the second and third user data management servers are different servers in the same region. For example, the second user data management server may store user data corresponding to the first data sensitivity level, and the third user data management server may store user data corresponding to the second data sensitivity level.

At block 422, the processing logic provides, to the third user data management server, a fourth request directed to the second data of the second user, wherein the fourth request comprises the identifier associated with the first region. Aspects of the fourth request may be similar to the third request described with reference to block 416.

At block 424, the processing logic receives a determination of the third user data management server indicating that the fourth request is to be fulfilled based at least on a second data use policy associated with the second and third region. For example, the second data use policy may be a country-level policy (e.g., third region) that overlaps with a state-level policy (e.g., second region). Aspects of the determination of the third user data management server may be similar to the determination of the second user data management server described with reference to block 418.

Computer Systems

FIG. 5 illustrates an example network server 500 with a secure environment 530 for providing distributed user data management with local data storage, in accordance with an embodiment. In an embodiment, network server 500 running secure environment 530 may correspond to user data management servers 110, 130, 160, or 180 of FIGS. 1A-B. Local user data 531 may correspond to local user data 118, 138, 168, or 188. Mapping store 532 may correspond to mapping stores 120, 140, 170, or 190.

As shown in FIG. 5, network server 500 may include processing device 510 that may execute operating system 520. Furthermore, processing device 510 may include one or more internal cryptographic keys 511 that may be used to encrypt and decrypt data stored in a portion of a memory that is assigned to secure environment 530. The access to the data of secure environment 530 (e.g., local user data 531 or mapping store 532) may be protected from one or more applications 540A-n and operating system 520. For example, the access to the data of the secure environment 530 may be protected by the use of one of internal cryptographic keys 511 that are internal to processing device 510 so that the access to the data is based on a hardware access as opposed to a software access. Operating system 520 may be associated with a first privilege level and secure environment 530 and applications 540A-n may be associated with a second privilege level where the first privilege level of the operating system is more privileged than the second privilege level of the various applications that are run on operating system 520 (e.g., the more privileged level allows access to more resources of the network server than the less privileged level). Thus, operating system 520 may be allowed access to resources of applications 540A-n. However, since access to the data of the secure environment 530 is based on the use of an internal cryptographic key 511 of processing device 510, operating system 520 may not be able to access local user data 531 or mapping store 532 despite having a more privileged level of access than secure environment 530. The master key that is used to decrypt data at the storage resource may be an internal cryptographic key 511.

Figure 4B:
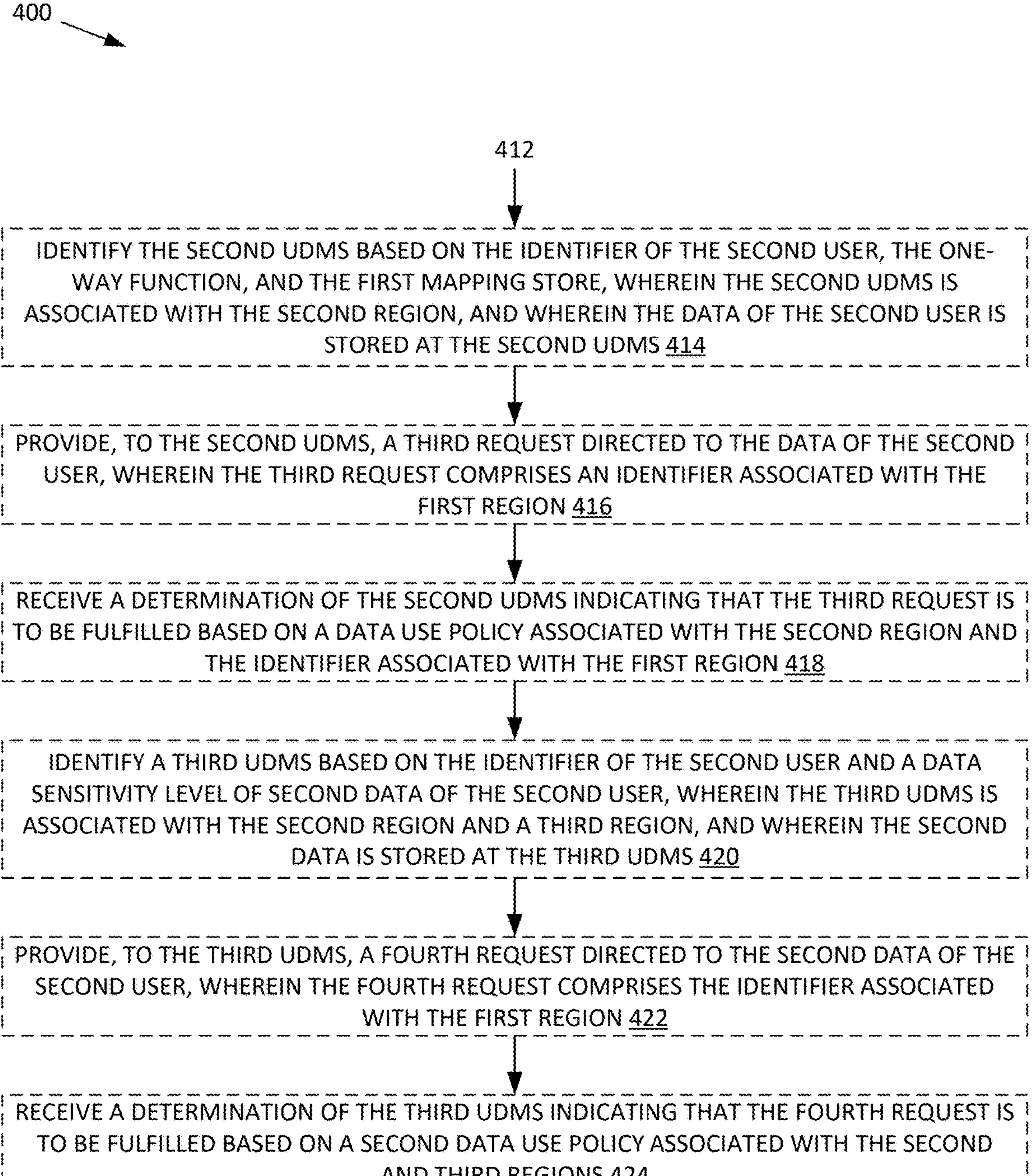

In operation, a client device (e.g., one of user devices 114, 134, or 164) may request that user data be stored, retrieved, or transacted with (e.g., the second request received at block 412 of FIG. 4B). To fulfill the request, network server 500 may identify the user data in local user data 531 or identify another network server storing the user data using mapping store 532. Due to the location of local user data 531 and mapping store 532 in secure environment 530, local user data 531 and/or mapping store 532 may be encrypted and protected by the use of an internal cryptographic key 511 (i.e., the master key) of processing device 510. Secure environment 530 may subsequently use an instruction so that processing device 510 may use one of its internal cryptographic keys 511 to decrypt the data of secure environment 530 and to retrieve the data. Subsequently, the user data or relevant mapping may be identified by processing device 510 and then the user data may be provided to the client device, retrieved from another network server, or transacted with by processing device 510. In some embodiments, internal cryptographic key 511 may be combined with additional information (e.g., user identifier 302, a regional identifier) to generate the master key for secure environment 530 that is used to decrypt and/or encrypt local user data 531 or mapping store 532. Thus, since processing device 510 uses its internal cryptographic key 511 to decrypt data and to perform the cryptographic operation, local user data 531, mapping store 532, and other data may not be exposed external to processing device 510. Client devices may thus be assured that user data and mappings managed by secure environment 530 have not been tampered with at network server 500 and may therefore trust attestations received from the cluster.

FIG. 6 is a block diagram illustrating an example computer system 600, in accordance with implementations of the present disclosure. Computer system 600 may correspond to user data management servers 110, 130, 160, or 180, or user devices 114, 134, or 164 described with reference to FIGS. 1A-B. Computer system 600 may also correspond to network server 500, described with respect to FIG. 5. Computer system 600 may operate in the capacity of a server or an endpoint machine in endpoint-server network environment, or as a peer machine in a peer-to-peer (or distributed) network environment. The machine may be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Computer system 600 includes processing device 602 (e.g., one or more processors or cores), main memory 604 (e.g., read-only memory (ROM), flash memory, dynamic random access memory (DRAM) such as synchronous DRAM (SDRAM), double data rate (DDR SDRAM), or DRAM (RDRAM), etc.), static memory 606 (e.g., flash memory, static random access memory (SRAM), etc.), and data storage device 608, which communicate with each other via bus 610.

Processing device 602 represents one or more general-purpose processing devices such as a microprocessor, central processing unit, or the like. More particularly, processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute instructions 612 (e.g., for cryptographic attestation of data object attributes in a distributed system) for performing the operations discussed herein.

Computer system 600 may further include network interface device 614. Computer system 600 also may include display device 616 (e.g., a liquid crystal display (LCD) or a cathode ray tube (CRT)), alphanumeric input device 618 (e.g., a keyboard, and alphanumeric keyboard, a motion sensing input device, touch screen), cursor control device 620 (e.g., a mouse), and signal generation device 622 (e.g., a speaker). In some embodiments, computer system 600 may not include display device 616, alphanumeric input device 618, and/or cursor control device 620 (e.g., in a headless configuration).

Data storage device 608 may include a non-transitory machine-readable storage medium 624 (also computer-readable storage medium) on which is stored one or more sets of instructions 612 (e.g., for cryptographic attestation of data object attributes in a distributed system) embodying any one or more of the methodologies or functions described herein. Instructions 612 may also reside, completely or at least partially, within main memory 604 or within the processing device 602 during execution thereof by computer system 600, main memory 604 and processing device 602 also constituting machine-readable storage media. Instructions 612 may further be transmitted or received over network 626 via network interface device 614.

In one implementation, instructions 612 include instructions for cryptographic attestation of data object attributes in a distributed system, as described herein. While computer-readable storage medium 624 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing certain terms may refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

As used in this application, the term "or" is intended to mean an inclusive "or" rather than an exclusive "or." That is, unless specified otherwise, or clear from context, "A or B" is intended to mean any of the natural inclusive permutations (e.g., A and B, A and not B, B and not A). In addition, the articles "a" and "an" as used in this application and the appended claims should generally be construed to mean "one or more" unless specified otherwise or clear from context to be directed to a singular form.

Furthermore, the terms "one implementation," "one embodiment," "an implementation," "an embodiment," or similar mean that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

What is claimed is:

1. A method comprising:

receiving, by a processing device of a first user data management server of a distributed user data management system, a request to enroll a first user in the distributed user data management system, wherein the request comprises an identifier of the first user, and wherein the first user data management server is associated with a first region of the distributed user data management system;

determining an anonymous representation of the first user based at least on the identifier of the first user and a one-way function;

storing, in a first mapping store of the first user data management server, a mapping of the anonymous representation of the first user to the first region;

receiving, from a second user data management server of the distributed user data management system, an indication to synchronize the first mapping store with a second mapping store of the second user data management server, the indication comprising a mapping of an anonymous representation of a second user to a second region of the distributed user data management system;

receiving, at the first user data management server, a second request directed to data of the second user, wherein the second request comprises an identifier of the second user, and wherein the data of the second user is stored at the second user data management server in accordance with a data use policy associated with the second region; and synchronizing the first mapping store with the second mapping store by adding, to the first mapping store, the mapping of the anonymous representation of the second user to the second region of the distributed user data management system.

2. The method of claim 1, wherein determining the anonymous representation of the first user comprises:

combining the identifier of the first user with a salt value;

generating a first hash output of a cryptographic hash function using the combined identifier of the first user and salt value as input to the cryptographic hash function; and generating a second hash output of the cryptographic hash function using the first hash output as input to the cryptographic hash function.

3. The method of claim 1, wherein the request to enroll the first user further comprises an indication that the first user is associated with the first region.

4. The method of claim 1, further comprising:

identifying the second user data management server based at least on the identifier of the second user, the one-way function, and the first mapping store, wherein the second user data management server is associated with the second region;

providing, to the second user data management server, a third request directed to the data of the second user, wherein the third request comprises an identifier associated with the first region; and receiving a determination of the second user data management server indicating that the third request is to be fulfilled based at least on the data use policy associated with the second region and the identifier associated with the first region.

5. The method of claim 4, wherein identifying the second user data management server comprises:

determining the anonymous representation of the second user based on the identifier of the second user and the one-way function; and identifying the second region based on the anonymous representation of the second user and the mapping of the anonymous representation of the second user to the second region added to the first mapping store.

6. The method of claim 4, wherein the determination of the second user data management server comprises at least one of: the data of the second user, a transaction completion message indicating that a transaction with the data of the second user was completed in the second region, or the data use policy associated with the second region.

7. The method of claim 4, wherein the data of the second user is associated with a first data sensitivity level, wherein the second request is further directed to second data of the second user associated with a second data sensitivity level, and wherein the method further comprises:

identifying a third user data management server based at least on the identifier of the second user and the second data sensitivity level, wherein the third user data management server is associated with the second region and a third region, and wherein the second data of the second user is stored at the third user data management server;

providing, to the third user data management server, a fourth request directed to the second data of the second user, wherein the fourth request comprises the identifier associated with the first region; and receiving a determination of the third user data management server indicating that the fourth request is to be fulfilled based at least on a second data use policy associated with the second and third regions.

8. The method of claim 4, wherein the second request is received from the second user, wherein the second user is located in the first region, wherein the third request further comprises an indication that the second request is received from the second user, and wherein the determination of the second user data management server is further based on the second request being received from the second user.

9. A system comprising:

a memory device; and a processing device coupled to the memory device, the processing device to perform operations comprising:

receiving, at a first user data management server of a distributed user data management system, a request to enroll a first user in the distributed user data management system, wherein the request comprises an identifier of the first user, and wherein the first user data management server is associated with a first region of the distributed user data management system;

determining an anonymous representation of the first user based at least on the identifier of the first user and a one-way function;

storing, in a first mapping store of the first user data management server, a mapping of the anonymous representation of the first user to the first region;

receiving, from a second user data management server of the distributed user data management system, an indication to synchronize the first mapping store with a second mapping store of the second user data management server, the indication comprising a mapping of an anonymous representation of a second user to a second region of the distributed user data management system;

receiving, at the first user data management server, a second request directed to data of the second user, wherein the second request comprises an identifier of the second user, and wherein the data of the second user is stored at the second user data management server in accordance with a data use policy associated with the second region; and synchronizing the first mapping store with the second mapping store by adding, to the first mapping store, the mapping of the anonymous representation of the second user to the second region of the distributed user data management system.

10. The system of claim 9, wherein determining the anonymous representation of the first user comprises:

combining the identifier of the first user with a salt value;

generating a first hash output of a cryptographic hash function using the combined identifier of the first user and salt value as input to the cryptographic hash function; and generating a second hash output of the cryptographic hash function using the first hash output as input to the cryptographic hash function.

11. The system of claim 9, wherein the request to enroll the first user further comprises an indication that the first user is associated with the first region.

12. The system of claim 9, the operations further comprising:

identifying the second user data management server based at least on the identifier of the second user, the one-way function, and the first mapping store, wherein the second user data management server is associated with the second region;

providing, to the second user data management server, a third request directed to the data of the second user, wherein the third request comprises an identifier associated with the first region; and receiving a determination of the second user data management server indicating that the third request is to be fulfilled based at least on the data use policy associated with the second region and the identifier associated with the first region.

13. The system of claim 12, wherein identifying the second user data management server comprises:

determining the anonymous representation of the second user based on the identifier of the second user and the one-way function; and identifying the second region based on the anonymous representation of the second user and the mapping of the anonymous representation of the second user to the second region added to the first mapping store.

14. The system of claim 12, wherein the determination of the second user data management server comprises at least one of: the data of the second user, a transaction completion message indicating that a transaction with the data of the second user was completed in the second region, or the data use policy associated with the second region.

15. The system of claim 12, wherein the data of the second user is associated with a first data sensitivity level, wherein the second request is further directed to second data of the second user associated with a second data sensitivity level, and wherein the operations further comprise:

identifying a third user data management server based at least on the identifier of the second user and the second data sensitivity level, wherein the third user data management server is associated with the second region and a third region, and wherein the second data of the second user is stored at the third user data management server;

providing, to the third user data management server, a fourth request directed to the second data of the second user, wherein the fourth request comprises the identifier associated with the first region; and receiving a determination of the third user data management server indicating that the fourth request is to be fulfilled based at least on a second data use policy associated with the second and third regions.

16. A non-transitory computer-readable medium comprising instructions that, when executed by a processing device, cause the processing device to perform operations comprising:

receiving, at a first user data management server of a distributed user data management system, a request to enroll a first user in the distributed user data management system, wherein the request comprises an identifier of the first user, and wherein the first user data management server is associated with a first region of the distributed user data management system;

determining an anonymous representation of the first user based at least on the identifier of the first user and a one-way function;

storing, in a first mapping store of the first user data management server, a mapping of the anonymous representation of the first user to the first region;

receiving, from a second user data management server of the distributed user data management system, an indication to synchronize the first mapping store with a second mapping store of the second user data management server, the indication comprising a mapping of an anonymous representation of a second user to a second region of the distributed user data management system;

receiving, at the first user data management server, a second request directed to data of the second user, wherein the second request comprises an identifier of the second user, and wherein the data of the second user is stored at the second user data management server in accordance with a data use policy associated with the second region; and synchronizing the first mapping store with the second mapping store by adding, to the first mapping store, the mapping of the anonymous representation of the second user to the second region of the distributed user data management system.

17. The non-transitory computer-readable medium of claim 16, the operations further comprising:

receiving, at the first user data management server, a second request directed to data of the second user, wherein the second request comprises an identifier of the second user;

identifying the second user data management server based at least on the identifier of the second user, the one-way function, and the first mapping store, wherein the second user data management server is associated with the second region;

providing, to the second user data management server, a third request directed to the data of the second user, wherein the third request comprises an identifier associated with the first region; and receiving a determination of the second user data management server indicating that the third request is to be fulfilled based at least on the data use policy associated with the second region and the identifier associated with the first region.

18. The non-transitory computer-readable medium of claim 17, wherein identifying the second user data management server comprises:

determining the anonymous representation of the second user based on the identifier of the second user and the one-way function; and identifying the second region based on the anonymous representation of the second user and the mapping of the anonymous representation of the second user to the second region added to the first mapping store.

19. The non-transitory computer-readable medium of claim 17, wherein the determination of the second user data management server comprises at least one of: the data of the second user, a transaction completion message indicating that a transaction with the data of the second user was completed in the second region, or the data use policy associated with the second region.

20. The non-transitory computer-readable medium of claim 17, wherein the second request is received from the second user, wherein the second user is located in the first region, wherein the third request further comprises an indication that the second request is received from the second user, and wherein the determination of the second user data management server is further based on the second request being received from the second user.

* * * * *